United States Patent
Coatrieux et al.

(10) Patent No.: US 11,481,476 B2
(45) Date of Patent: Oct. 25, 2022

(54) METHOD FOR EXTRACTING DATA FROM A DATABASE OF DATA ARE WATERMARKED ACCORDING TO A REVERSIBLE WATERMARKING MECHAISM

(71) Applicant: INSTITUT MINES TELECOM, Paris (FR)

(72) Inventors: Gouenou Coatrieux, Saint-Renan (FR); Javier Franco Contreras, Le Kremlin-Bicetre (FR)

(73) Assignee: INSTITUT MINES TELECOM, Paris (FR)

( * ) Notice: Subject to any disclaimer, the term of this patent is extended or adjusted under 35 U.S.C. 154(b) by 674 days.

(21) Appl. No.: 16/463,353

(22) PCT Filed: Nov. 24, 2017

(86) PCT No.: PCT/EP2017/080428
§ 371 (c)(1),
(2) Date: May 22, 2019

(87) PCT Pub. No.: WO2018/096126
PCT Pub. Date: May 31, 2018

(65) Prior Publication Data
US 2019/0294763 A1    Sep. 26, 2019

(30) Foreign Application Priority Data
Nov. 25, 2016    (FR) ........................................ 1661520

(51) Int. Cl.
*G06F 16/2455*    (2019.01)
*G06F 16/248*    (2019.01)
(Continued)

(52) U.S. Cl.
CPC ............ *G06F 21/16* (2013.01); *G06F 16/248* (2019.01); *G06F 16/2455* (2019.01);
(Continued)

(58) Field of Classification Search
CPC .. G06F 21/16; G06F 21/6218; G06F 21/6245; G06F 16/903; G06F 16/90335;
(Continued)

(56) References Cited

U.S. PATENT DOCUMENTS

2004/0044893 A1* 3/2004 Alattar ............... H04N 1/32283
713/176
2004/0243816 A1* 12/2004 Hacigumus ....... G06F 16/24561
713/193

(Continued)

OTHER PUBLICATIONS

Yeqing, et al., "A Digital Watermarking Approach to Secure and Precise Range Query Processing . . . ," Infocom, IEEE, Apr. 2013.
(Continued)

*Primary Examiner* — Joshua Bullock
(74) *Attorney, Agent, or Firm* — CRGO Global; Steven M. Greenberg

(57) ABSTRACT

The present invention proposes a rapid, reliable data extraction method for extracting data from a database of data (3) that is watermarked according to a reversible watermarking method. The method according to the invention consists of obtaining, from a first extraction request received from a client terminal (1), a second extraction request (R2) for extracting watermarked data and a third request (R3) applied to the extracted data after it has been de-watermarked. In the presence in the first extraction request of initial selection conditions relating to watermarked properties, these are included in the second request after having been transformed. In the presence in the first extraction request (R1), of aggregation functions relating to a watermarked extraction property, these are included without modification in the
(Continued)

Figure 1:
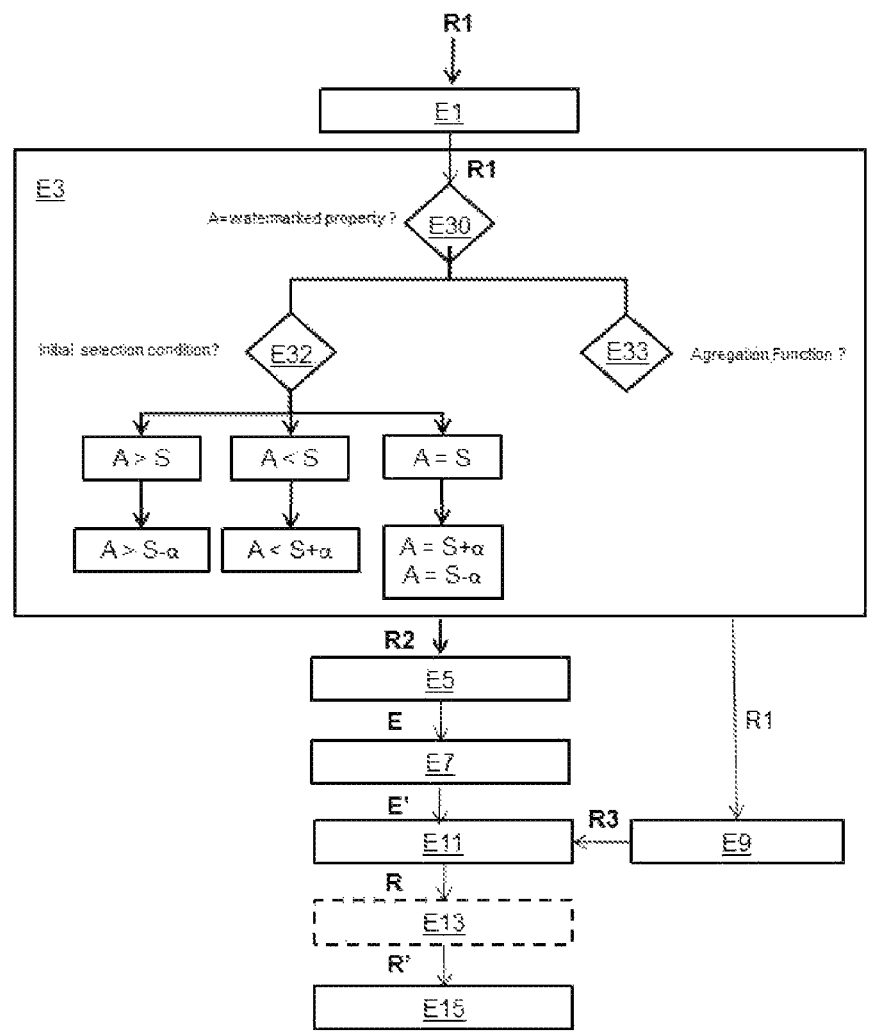

third request (R3) so as to supply a result to the client terminal (1) in response to the first extraction request (R1).

10 Claims, 2 Drawing Sheets

(51) Int. Cl.
    *G06F 16/25*      (2019.01)
    *G06F 16/903*    (2019.01)
    *G06F 21/16*     (2013.01)
    *G06F 21/62*     (2013.01)

(52) U.S. Cl.
    CPC .......... *G06F 16/254* (2019.01); *G06F 16/903* (2019.01); *G06F 16/90335* (2019.01); *G06F 21/6218* (2013.01); *G06F 21/6245* (2013.01); *G06F 2221/0733* (2013.01); *G06F 2221/0737* (2013.01)

(58) Field of Classification Search
    CPC .. G06F 16/2455; G06F 16/248; G06F 16/254; G06F 2221/0733; G06F 2221/0737
    USPC .......................................................... 707/769
    See application file for complete search history.

(56) References Cited

U.S. PATENT DOCUMENTS

2005/0262347 A1* 11/2005 Sato ................... G06F 21/16
                                                   713/176
2009/0089427 A1* 4/2009 Moskowitz ............ H04L 63/08
                                                   709/225

OTHER PUBLICATIONS

Franco-Contreras, et al., "Robust Lossless Watermarking of Relational Databases Based on Circular . . . ," Info Forensics, IEEE, vol. 9, No. 3, Mar. 2014.
Franco-Contreras, "Watermarking Services for Medical Database Content Security," http://hal.archives-ouvertes.fr, Dec. 2014.

* cited by examiner

METHOD FOR EXTRACTING DATA FROM A DATABASE OF DATA ARE WATERMARKED ACCORDING TO A REVERSIBLE WATERMARKING MECHAISM

CROSS-REFERENCE TO RELATED APPLICATIONS

This application is a § 371 national phase entry of International Application No. PCT/EP2017/080428, filed Nov. 24, 2017, which claims priority to French Patent Application No. 1661520, filed Nov. 25, 2016.

FIELD OF THE INVENTION

The field of the invention is IT security and more specifically the protection of datasets stored, for example, in the form of a database.

The invention aims in particular to prevent cybercrime attacks performed within businesses and public institutions by employees or colleagues who are authorised to access the information stored in databases. This relates in particular to misappropriation, leaking, theft, or deliberate or accidental defacement of this information. Such attacks currently represent around 43% of reported cybercrime incidents.

PRIOR ART

In order to ensure the traceability of the extracted data and certify the authenticity of the person having extracted this data, it is known to watermark the entirety of the data contained in a dataset, for example stored in the form of a database, the watermarking allowing the user to access the information whilst keeping it protected with a watermark.

By definition, watermarking data refers to a technique consisting of inserting a watermark into the data (known as source or host data) to be protected. The data into which the watermark has been inserted is referred to as being watermarked.

The watermark is a message containing security properties, such as a signature or authentication code, that make it possible for the owner of a database to trace the users who access this data or to check the integrity of the latter.

The reversibility property is a characteristic specific to some types of watermarking that provides the option of the watermarking the watermarked data and recovering the original data, i.e. before the application of the watermark.

Robust, reversible methods for watermarking data have been presented by J. Franco-Contreras, G. Coatrieux, F. Cuppens, N. Cuppens-Boulahia, E. Chazard and C. Roux in "Robust, reversible watermarking for traceability of relational health databases" (*Tatouage Robuste et Réversible pour la Traçabilité de Bases de Données Relationnelles en Santé*), at the Health Imaging and Technology Research conference (*Recherche en Imagerie et Technologies pour la Santé, RITS*), April 2013, Bordeaux, France.

Conventionally, extracting data from one or more datasets, in particular from a database, requires watermarking/de-watermarking operations that relate to the entirety of the dataset or datasets so as to be able to produce a reliable result in response to an extraction request made by a user who has the rights to access this database.

Below, reference will be made to a database, which is one particular form of structuring one or more datasets, but naturally, the remainder of the description can also be applied without distinction to databases and in particular to relational databases.

In view of the limited processing capabilities (memory, processors) of current database management systems, these watermarking/de-watermarking operations are particularly disadvantageous for extracting data, since they require significant processing times, whilst the volume of data to be extracted is generally relatively low (a few kilobytes) compared with the capacity of the database (several terabytes). Moreover, complete de-watermarking of the database, even temporarily, must be avoided for security reasons.

Consequently, there is therefore a need to extract, in a minimum amount of time, data contained in a database of data that is watermarked using a reversible watermarking mechanism. The data needs to be extracted in a way that is transparent to the user and in an optimised and reliable manner, as if the extraction were being performed on the database of non-watermarked data.

AIM AND SUMMARY OF THE INVENTION

The present invention provides a solution that addresses the aforementioned technical problem by proposing a method for extraction of data by a server from a database of data that is watermarked according to a reversible watermarking mechanism, defined by watermarking metadata, said database comprising tuples comprising at least one watermarked property and preferably at least one non-watermarked property, said method being characterised in that it comprises:
  a step of receiving a first extraction request from a client terminal to select a first set of tuples from said database, according to at least one initial selection condition relating to the value of said at least one watermarked property with respect to at least one threshold, said first request preferably comprising at least one selection condition relating to said at least one non-watermarked property;
  a step of obtaining, from said first extraction request, a second extraction request to select a second set of tuples comprising the properties of the first set of tuples comprising said at least one watermarked property to which said at least one selection condition relates, said second extraction request comprising at least one selection condition obtained by transforming said at least one initial selection condition relating to at least one watermarked property A, the second extraction request preferably comprising said at least one selection condition, relating to said at least one non-watermarked property, that is contained in the first extraction request;
  an extraction step (E5), during which the tuples of said second set (E) are extracted from said database (3) according to the second extraction request;
  a de-watermarking step (E7), during which the tuples of said second set of extracted tuples (E) are de-watermarked (E') according to the watermarking metadata (M).

The method according to the invention advantageously makes it possible to reduce the time required for extracting data from a database of watermarked data, whilst avoiding de-watermarking the whole the database. The transformation of the selection conditions relating to watermarked properties makes it possible to de-watermark only a subset of tuples of the database whilst taking into account the modifications made to the values of the watermarked properties according to the watermarking strength. The application of the third request makes it possible to obtain the response to a user's initial extraction request on a sub-set of tuples as if they had applied it to the non-watermarked data.

Preferably, the second extraction request comprises at least one selection condition, relating to a non-watermarked property present in the first extraction request.

Given that the values of the non-watermarked properties have not been altered during the insertion of the data into the database, any selection condition relating to a property of this type can be applied directly to the database of watermarked data without any risk of error.

According to another characteristic of the invention, said at least one watermarked property A is numerical, and said at least one initial selection condition with respect to said at least one threshold S is transformed in a function of a watermarking strength $\alpha$ stipulated in the watermarking metadata according to one of the following cases:
- if said initial condition is of the type $A>S$ or $A\geq S$, it is transformed into $A>S-\alpha$ or $A\geq S-\alpha$ respectively;
- if said initial condition is of the type $A<S$ or $A\leq S$, it is transformed into $A<S+\alpha$ or $A\leq S+\alpha$ respectively;
- if said initial condition is of the type $S1\leq A\leq S2$, it is transformed into $A\geq S1-\alpha$ and $A\leq S2+\alpha$;
- if said initial condition is of the type $S1<A<S2$, it is transformed into $A>S1-\alpha$ and $A<S2+\alpha$;
- if said initial condition is of the type $A=S$, it is transformed into $A=S+\alpha$ or $A=S-\alpha$;
- if said initial condition is of the type $A\neq S$, it is transformed into $A\neq S+\alpha$ or $A\neq S-\alpha$.

According to another characteristic of the invention, said at least one watermarked property A is of categorical type and said at least one initial selection condition is transformed into at least two sub-conditions that bring about the selection of tuples with respect to categorical values determined as a function of a watermarking rule predefined in the watermarking metadata.

According to another characteristic of the invention, the second extraction request comprises at least one aggregation function relating to a non-watermarked property that is contained in the first extraction request.

Given that the values of the non-watermarked properties have not been altered during the insertion of the data into the database, any aggregation function relating to such a property can be applied directly to the database of watermarked data without any risk of error.

According to another characteristic of the invention, in the presence in said first extraction request of at least one aggregation function relating to a watermarked property, said at least one aggregation function is excluded from said second extraction request but included in the third request, and the watermarked property to which said at least one watermarked aggregation function relates is inserted into the second extraction request as a selection property.

The aggregation functions are only applied to the extracted data after the de-watermarking step to avoid any extraction errors. Indeed, the result of an aggregation function relating to a watermarked property would risk giving an incorrect result in view of the watermarking strength used.

According to another characteristic of the invention, the database is a relational database comprising a primary key, and the second selection request comprises said primary key as a selection property.

According to another characteristic of the invention, the method further comprises a watermarking step, during which the extracted de-watermarked data from the filtering or transformation step are watermarked before the sending step.

Watermarking the extracted data before sending it advantageously makes it possible to strengthen the protection of the data against fraud committed by persons authorised to access the database of watermarked data. The watermarking consists of concealing one or more messages in the extracted data using a reversible or irreversible watermarking technique, it being possible for this technique to be different from the one used to watermark the data of the tuples during the insertion thereof into the database.

According to another characteristic of the invention, watermarking the data comprises inserting into the extracted de-watermarked data at least one identifier of a user who made the first extraction request and/or at least one signature and/or traceability information.

The insertion of the user's identifier in the extracted data advantageously makes it possible to authenticate/identify the person at the origin of the first extraction request.

The insertion of traceability information in the extracted data advantageously makes it possible to certify the origin of the extracted data (e.g. the owner of the database) or to determine authorised durations of use of the data. Among the traceability information, an identifier of the server to which the database is attached can also appear, which is particularly advantageous for preventing theft of sensitive information.

The signature can also be suitable for retrospective verification of the integrity of the data as soon as it has been extracted from the database, this being particularly advantageous for detecting the case where the extracted data would have been falsified.

In a particular embodiment, the steps of the aforementioned method are determined by computer program instructions.

Consequently, the invention also relates to a computer program on an information carrier, this program being executable by a microprocessor, this program comprising instructions adapted for carrying out the steps of the method such as mentioned above.

This program can use any programming language and be in the form of source code, object code, or an intermediate code between source code and object code, such as in a partially compiled form, or in any other form that can be desired.

The invention also relates to an information carrier readable by a microprocessor and comprising instructions of a computer program such as set out above. This information carrier can be an information storage medium, removable or not, partially or fully readable by a computer or a microprocessor.

The information carrier can be any entity or device capable of storing the program. For example, the carrier can comprise a storage means, such as a ROM, for example a microcircuit ROM, or also a magnetic recording medium, for example a hard disk, or also a flash memory.

Moreover, the information carrier can be a transmissible carrier such as an electrical or optical signal, which can be conveyed via an electric or optical cable, by radio or by other means. The program according to the invention can in particular be downloaded from a storage platform of an Internet network.

Alternatively, the information carrier can be an integrated circuit into which the program is incorporated, the circuit being suitable for executing or for use in the execution of the method in question.

The aforementioned information carrier and computer program present similar characteristics and advantages to the method that they implement.

The invention also relates to a server suitable for executing the instructions for implementing the steps of the method according to the invention.

Figure 2:
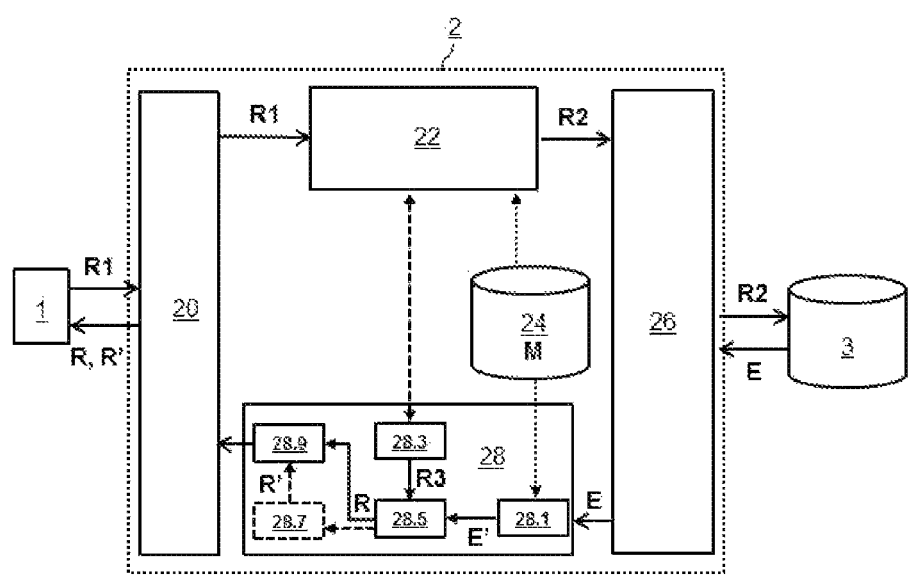

Other details and advantages of the invention will also appear from the following description in relation to the accompanying drawings, which are given by way of non-limiting example:

FIG. 1 schematically shows the steps of the method according to an embodiment of the invention, and FIG. 2 schematically shows a client/server system suitable for implementing the method according to the invention.

DEFINITIONS

Below, a relational database refers to a data structure composed of a finite number of relations or tables. Each table or relation is a base structure, gathering data on a specific subject, such as patients' stays in a hospital.

Each table or relation comprises a set of N unordered tuples $\{t_u\}$, where N and u are natural numbers $1 \leq u \leq N$, where each tuple $t_u$ comprises a plurality M of properties denoted $\{A_1, A_2, \ldots, A_n, \ldots, A_M\}$, M designating a natural number. Each property $A_n$ takes values within a given range of properties. The value of the $n^{th}$ property of the $u^{th}$ tuple is denoted $t_u.A_n$. Each tuple is uniquely identified by a primary key $t_u.PK$ denoting a property or set of properties or the result of a function applied to a set of properties. Data refers to any type of digital information that can be contained in a database, in particular a relational database.

By way of an illustrative and non-limiting example, the following considers a single table denoted by the identifier Table and comprising information relating to patients' stays in a hospital, from which a user extracts data. The properties of this table comprise in particular the stay identifier "stay_id", age "Age", sex "Sex" and length of stay "Stay_length" of patients who have stayed in the hospital. Thus, a record of this table consists of a tuple comprising the set of values of the properties stay_id, Age, Sex, Stay_length for a given stay, as shown schematically in Table 1 below, which comprises N tuples, each tuple corresponding to a line of the table.

In this example, the property Sex takes a value from the set {Male, Female} whilst the property Age takes a numerical value from the range [0-110]. The primary key consists of the property stay_id, which makes it possible to extract information relating to a particular stay among the set of stays recorded in the table.

TABLE 1

Example table: Table

| stay_id | Age | Sex | Stay_length |
|---------|-----|--------|-------------|
| Id1 | 13 | Male | 10 |
| ... | ... | ... | ... |
| IdN | 40 | Female | 5 |

By definition, reversible watermarking refers to any digital data watermarking technique capable of deleting from said data, a watermark previously inserted to watermark the data, so as to recover the original data, in other words the data before the application of the watermarking.

Thus, a reversible watermarking mechanism refers to any technique or set of techniques implemented by software means capable of inserting and deleting a watermark into and from the data.

During the watermarking operation, the insertion of the watermark consists of altering the values of particular properties $A_n$ in the database according to a watermarking strength $\pm \alpha_n$, or insertion strength (in other words the modification made to each value of the watermarked properties to conceal the watermark there). Below, the terms "insertion strength" and "watermarking strength" will be used without distinction to denote the same value. The watermarking strength $\alpha_n$ can be different for each watermarked property.

Generally, the insertion of a watermark requires the insertion strength to have a non-zero value. Thus, the value of a numerical watermarked property $A_n$ will be altered by a non-zero amount of $\pm \alpha_n$, where $\alpha_n$ is a number not equal to zero 0. For example, this number can be a positive or negative integer or real number depending on the nature of the property under consideration.

In the present example, the patient's age is a property watermarked with a watermarking strength $\alpha$ equal to $\pm 3$. For the tuple identified by Id1 in the database of watermarked data, the value of the patient's age is 13, knowing that the original value of this watermarked property is 10 or 16, depending on the watermarking or insertion strength.

The watermarking metadata M comprise information defining the reversible watermarking mechanism implemented.

In particular, this metadata comprises the parameters of the method of inserting the mark into the data to be watermarked, such as the watermarking or insertion strength used to alter the values of the properties watermarked during the insertion of the watermark, the maximum and minimum values of the watermarked properties, the values of sequences inserted into the data.

The metadata also comprises data that are independent of the watermarking method under consideration. They indicate, for example, the watermarked properties, the property or properties forming the primary key of the relation, the watermarked identifiers, the manner of calculating digital signatures etc.

DETAILED DESCRIPTION OF AN EMBODIMENT

An embodiment of the invention will be described referring jointly to FIGS. 1 and 2, which respectively illustrate the steps of the data extraction method and a system for implementing said method according to an embodiment of the invention.

In terms of equipment, the extraction method according to the invention is implemented in a "client-server" system comprising a client 1, a server 2 suitable for communicating with the client, and a database 3 of watermarked data. More specifically, the steps of the method according to the invention are implemented by one or more servers, in particular the server 2. The database 3 of watermarked data can be remote from the server 2, in particular for security reasons.

It is assumed that the database 3 comprises data which has been watermarked previously, during the insertion thereof into the database, according to a reversible watermarking mechanism defined by watermarking metadata M. In the present example, this metadata is stored in a storage space 24 within the server 2 intended for implementing the method according to the invention.

The client 1 is implemented in a user terminal, such as a computer, a mobile phone, a tablet, or any other type of device suitable for communicating with the server 2 via a telecommunications network (not represented).

The server 2 is implemented in any type of computer suitable for reading and extracting data from the database 3 in respect to extraction requests made by the client to obtain the data from the database 3. Conventionally, the server 2 comprises a processing unit composed of at least one processor having one or more processor cores. This unit is responsible for executing computer programs executed on the server and in particular a computer program comprising the instructions necessary for implementing the method according to the invention. The processing unit is connected to a set of peripherals via communication buses. The peripherals comprise at least one live memory module forming a volatile working memory intended to store programs undergoing execution and the data on which these programs operate, such as requests, data extracted from databases. The processing unit is also connected via the bus to a network input/output module which connects the server to a communication network. Other peripherals, such as an SSD (solid state drive) or flash memory disk can be connected to this same bus. In current machines, the bus can be a PCIe (PCI Express) bus. The processing unit is also connected via a second communications bus to other peripherals such as permanent storage units such as hard disks, other input/output peripherals such as a USB interface etc.

Below, request extraction will refer to any command formulated according to a given computing language so as selectively to extract records or tuples meeting particular selection or filtering criteria, such as selection conditions and/or aggregation functions relating to one or more properties of a relation or table.

In the different examples discussed below, the language used for formulating and executing data extraction requests is SQL (structured query language). This language, which is widely used for managing databases, is particularly well-suited to relational databases. In the present case, it is assumed that the server 2 is suitable for processing SQL requests previously generated and made by the SQL or SQL-compatible client 1 installed on the terminal of the user who wishes to extract data.

It is noted, that the use of SQL is given purely by way of an illustrative example, and that it is not of a limiting nature as regards the invention. Naturally, a person skilled in the art can, using their general knowledge and technological developments, adapt the examples set out below to any other appropriate type of language for extracting data from databases, in particular relational databases, whilst remaining within the scope of the present invention.

Below, selection condition refers to any condition relating to comparing the value of a property A with at least one predetermined threshold S using any of the following comparison operators:
"$>$" (strictly greater than): condition of the type $A>S$
"$\geq$" (greater than or equal to): condition of the type $A\geq S$
"$<$" (strictly less than): condition of the type $A<S$
"$\leq$" (less than or equal to): condition of the type $A\leq S$
"$=$" (equal to): condition of the type $A=S$
"$!=$" (different from): condition of the type $A!=S$
"BETWEEN" (between): condition of the type A BETWEEN S1 AND S2 (indicating that the value of the property A is between S1 and S2, where S1 and S2 are two numerical thresholds).

It is noted, that for the BETWEEN operator, some systems include the values defining the interval, i.e. S1 and S2, whilst other systems exclude these values.

These operators defined in SQL are given by way of example and apply to numerical properties. Other types of operator applying to categorical properties can also be considered, such as LIKE, making it possible to search for records in which the value of a column begins with a given letter or character. Below, aggregation function refers to any calculation function operating on one or more properties. These can be statistical functions, such as calculating the sum SUMO, average AVG( ), standard deviation, number of tuples in a table COUNT( ), or determining a maximum MAX( ) or minimum MIN( ) value within a set of values.

EXAMPLES

By way of illustrative, non-limiting examples, an embodiment of the invention will be described in relation to the three following examples:
  in a first example, a user wishes to know all of the records where the patients stayed in the hospital for exactly 10 days;
  in a second example, a user wishes to know the identifiers of the stays where the patients stayed in the hospital for more than 10 days;
  in a third example, a user wishes to know the maximum age of the patients of male sex who stayed in the hospital for less than 10 days.

These examples have been selected so as to demonstrate different variant implementations of the embodiment of the described invention, without any limiting nature. Thus, a person skilled in the art will be able to conceive of other examples according to the principle of the invention.

For each of the examples set out above, it is assumed that a client 1 makes a first extraction request R1 towards the server 2 to extract data from the database 3 of watermarked data. The first extraction request R1 is to select a subset of tuples from the database 3, according to an initial selection condition relating to a watermarked property, for example the Stay_length property, such as stipulated in the watermarking metadata M.

In these examples, it is assumed that the properties Stay_length and Age are properties watermarked with watermarking strengths $\alpha_1$, $\alpha_2$ equal to ±2 and ±3 respectively, such that the values of these properties have been altered by ±2 and ±3 respectively, during the insertion of the data into the database consisting of advance watermarking. The declaration of these watermarked properties in association with their respective watermarking strengths $\alpha_1$, $\alpha_2$ constitutes a piece of information relating to the watermarking mechanism that is contained in the watermarking metadata M.

In SQL language, an extraction request is generally formulated as follows:
  R1: SELECT Properties, Aggregation function(s) FROM Table WHERE Conditions The SELECT Properties command has the function of selecting the properties denoted by Properties from the tuples of the table denoted by Table using the FROM operator. The selection can also include one or more aggregation functions, each aggregation function can relate to one or more properties from said table. The WHERE Conditions command is used to limit the number of records by setting selection conditions Conditions relating to one or more properties. Generally, the first extraction request is in the following form:

In example 1, the first extraction request R11 is formulated in SQL language according to the following example:
  R11: SELECT * FROM Table WHERE Stay_length=10
  where all of the properties are selected from the tuples contained in the table Table, for which the value of the property Stay_length is exactly equal to a threshold S set at 10 days. In this case, the initial selection condition is Stay_length=10. Thus, the first request R11 makes it possible to select a first set of tuples from the database 3 according to the selection condition.

In this example, all of the properties have been selected using the operator *, but in other examples, this operator can be replaced with one or more properties to be specifically selected.

In example 2, the first extraction request R12 is formulated in SQL language, according to the following example:
R12: SELECT Stay_id FROM Table WHERE Stay_length>10
where the identifiers of the stays contained in the table Table are selected for which the value of the watermarked property Stay_length is strictly greater than a threshold S set at 10 days. The property Stay_id is designated as a selection property (or property to be selected). Thus, the first request R12 makes it possible to select a first set of tuples from the database 3, according to the selection condition Stay_length>10.

In example 3, the first extraction request R13 is formulated in SQL language according to the following example:
R13: SELECT Max(Age) FROM Table WHERE Sex='Male' AND Stay_length<10 where the maximum value, in other words Max(Age), of the patients of male sex, i.e. Sex='Male', is selected from the tuples in the table Table where the value of the watermarked property Stay_length is strictly less than a threshold S set at 10 days.

Thus, the first request R13 has the aim of selecting a first set of tuples from the database 3 according to the two selection conditions Stay_length<10 and Sex='Male'. It is noted, that the selection condition Sex='Male' relates to the property Sex, which is not a watermarked property.

The request R13 further comprises an aggregation function Max( ) relating to the watermarked property Age. Thus, this first set of tuples only contains a single tuple, which in turn, contains one single property (i.e. the maximum value of the age of the patients of male sex who have stayed at the hospital for less than 10 days).

For the sake of simplification, one single initial selection condition relating to a watermarked property has been described in the first extraction request R1, but a person skilled in the art will understand that the invention applies, obviously, to the case where this request comprises at least one, in particular several, initial selection conditions.

During a reception step E1, the first extraction request R1 is received by the server 2 and more specifically by a module 20 for receiving or intercepting the requests which is implemented in said server.

Upon receiving the first extraction request R1, the server 2 generates a second extraction request R2, during a generation or obtainment step E3. For this purpose, the server implements a module 22 for rewriting the requests 22, which, from the first extraction request R1, generates the second extraction request R2 comprising a selection condition obtained by transforming the initial selection condition relating to the watermarked property Stay_length.

For this purpose, the rewriting module 22 can include, generally, implementing a step of preliminary analysis of the first extraction request R1, as a function of the watermarking metadata M, to detect the potential presence of watermarked properties in said first extraction request R1.

In the case of detection of one or more watermarked properties, the rewriting module 22 determines whether initial selection conditions and/or aggregation functions relating to the watermarked properties, identified during the analysis step, are present in the first extraction request R1.

If so, these selection conditions and/or aggregation functions are saved in a memory element of the server (for example a live RAM).

Generally speaking, in presence in the first extraction request R1,
- an initial selection condition relating to a non-watermarked property, this condition is included, without modification, in the second extraction request R2;
- an initial selection condition relating to a watermarked property, this condition is transformed before being included in the second extraction request R2, and the watermarked property to which this condition relates is designated as a selection property in the second extraction request R2;
- an aggregation function relating to a non-watermarked property, this function is included, without modification, in the second extraction request R2;
- an aggregation function relating to a watermarked property, this function is excluded from the second extraction request R2, but the watermarked property to which this function relates is designated as a selection property in the second extraction request R2.

Generally, in presence of the first extraction request R1, of an initial selection condition relating to a watermarked property, this condition is altered whilst taking into account the watermarking strength of the watermarked property, as described below. Taking into account this watermarking strength for transforming the initial selection condition advantageously makes it possible to prevent tuple selection errors.

Generally, in presence in the first extraction request R1, of an aggregation function relating to a watermarked property, this function is subsequently included in a third request R3 described below. The fact of excluding this function from the second extraction request R2 avoids tuple selection errors, given that the value of the watermarked properties has been altered according to the watermarking strength. For example, the result of a sum calculated over the watermarked values will not necessarily be correct as a result of the marking strength. Thus, calculation of aggregates relating to the watermarked data is avoided.

In all cases, the modifications of the values of the properties watermarked using the watermarking mechanism under consideration are taken into account to obtain the second extraction request R2.

In the present examples, the rewriting module 22 determines from the metadata that the property Stay_length to which the initial selection condition relates is a watermarked property. For the sake of simplification, a single selection condition has been considered, but naturally the same treatment would apply to each of the conditions in the case where a plurality of selection conditions relating to watermarked properties were comprised in the first extraction request R1.

Generally, as a function of the form of the initial selection condition relating to the watermarked property Stay_length as identified, the selection condition is transformed by the rewriting module 22 according to one of the following cases:
- if the initial condition is of the type $A>S$, it is transformed into $A>S-\alpha$;
- if the initial condition is of the type $A \geq S$, it is transformed into $A \geq S-\alpha$;
- if the initial condition is of the type $A<S$, it is transformed into $A<S+\alpha$;
- if the initial condition is of the type $A \leq S$, it is transformed into $A \leq S+\alpha$;

if the initial condition is of the type S1≤A≤S2 (in other words A BETWEEN S1 AND S2), it is transformed into A≥S1−α AND A<S2+α, where AND designates the "and" operator;

if the initial condition is of the type A=S, it is transformed into A=S+α OR A=S−α, where OR designates the "or" operator;

if the initial condition is of the type A!=S, it is transformed into A!=S+α OR A!=S−α.

In example 1, given that the initial selection condition Stay_length=10 is of the type A=S where S is a threshold set at 10, the condition is transformed by the rewriting module 22 into a condition A=S−α or A=S+α and included in the second extraction request R21, which is expressed as follows:

R21: SELECT * FROM Table WHERE Stay_length=8 OR Stay_length=12

In example 2, given that the initial selection condition Stay_length>10 is of the type A>S, it is transformed into A>S−α where α=2, in other words Stay_length>8, to obtain the second extraction request R22, which is expressed as follows:

R22: SELECT Stay_id FROM Table WHERE Stay_length>8

The primary key Stay_id has been designated as a selection property of the second extraction request R22.

In example 3, given that the initial selection condition Stay_length<10 is of the type A<S, it is transformed into A<S+α where α=2, to obtain the second extraction request R23, which includes the transformed initial condition Stay_length<12. In this example, the second extraction request R23 is formulated as follow:

R23: SELECT Stay_id, Age, Stay_length FROM Table WHERE Sex='Male' AND Stay_length<12

Thus, to satisfy the first extraction request R13 made by the user, the initial condition has been adapted as a function of the watermarking of the property Stay_length, the values of which have been altered by ±2 by the watermarking.

Given that the initial selection condition Sex='Male' relates to a non-watermarked property, it is inserted without any modification into the second extraction request R23.

According to a particularity of the invention, the property Age to which the aggregation function Max( ) relates and the property Stay_length to which the initial selection condition relates are designated as selection properties in the second selection request R2 in the body of the SELECT command.

The primary key Stay_id has been designated as a selection property of the second extraction request R23.

Generally, as soon as the second extraction request R2 is obtained or generated by the rewriting module 22, the server 2 extracts, during an extraction step E5, watermarked data from the database 3, called watermarked extracted data E, in response to the application of the second extraction request R2.

Generally, this watermarked extracted data E consists of a second set of tuples comprising the properties of the first set of tuples and in particular the selection properties as designated in the second extraction request R2, taking into account the selection conditions and any aggregation functions.

For the extraction, the server 2 implements a database management module 26 which obtains the watermarked extracted data E from the database 3.

For example, this management module is a software module supporting the relational model capable of manipulating data with relational operators. Thus, the management module 26 applies the second extraction requests R21, R22 and R23 respectively to the database 3 in the first, second and third examples respectively.

The watermarked extracted data E obtained from the extraction step E5 is supplied to a processing module 28 of the server 2, which de-watermarks this data during a de-watermarking step E7 so as to provide de-watermarked extracted data E'.

For example, the data is de-watermarked by a de-watermarking submodule 28.1 implemented in software form within a processing module 28 of the server 2. For carrying out the watermarking, certain watermarking metadata M is used, such as the marking strength±2 associated with the property Stay_length, the marking strength±3 associated with the property Age, and the primary key Stay_id.

Generally, a third request R3 is obtained by the server 2, during an obtainment step E9 for selecting, from the de-watermarked extracted data E', the tuples that meet the initial selection conditions previously identified by the server 2 in the first extraction request R1, these conditions relating to the initially watermarked properties.

In the case where the first extraction request R1 contains aggregation functions relating to initially watermarked properties, the server 2 introduces these functions into the third request R3.

The third request R3 is generated for example by a submodule 28.3 of the processing module 28 of the server 2, by including therein the initial selection conditions and where applicable, the aggregation functions relating to watermarked properties, these conditions and functions having been previously identified by the server (rewriting module 22) in the first extraction request R1.

In example 1, the third request R31 relates to selecting, from the de-watermarked extracted data E', the set of tuples for which the length of stay is 10 days, by applying the initial selection condition Stay_length=10 as specified in the first extraction request R31. The third request R13 is expressed as follows:

R31: SELECT * FROM E'WHERE Stay_length=10

In example 2, the third request R32 relates to selecting stay identifiers from the de-watermarked extracted data E' for which the length of stay is greater than 10 days, by applying the initial selection condition Stay_length>10 as specified in the first extraction request R12. The third request R32 is expressed as follows:

R32: SELECT Stay_id FROM E'WHERE Stay_length>10

In example 3, the third request R33 relates to determining the maximum age of the patients by calculating the function Max(Age) from de-watermarked extracted data E' for which the length of stay is less than 10 days, by applying the initial selection condition Stay_length<10 as specified in the first extraction request R13. The third request R33 is expressed as follows:

R33: SELECT Max(Age) FROM E'WHERE Stay_length<10

Generally, during a filtering or transformation step E11, the third request R3 is applied by the server 2 (submodule 28.5 of the processing module 28 of the server 2) to the de-watermarked extracted data E', so as to provide a result R to be sent to the client 1, during a sending step E15, in response to the first extraction request R1. This sending step E15 can be implemented, for example, by a transmission submodule 28.9 of the processing module 28 of the server 2.

By executing the third request, the initial selection condition as specified in the first extraction request in examples 1 and 2 and the aggregation function Max(Age) relating to the watermarked property Age in example 3 being respectively applied and calculated over non-watermarked data, it is possible to supply a reliable result to the user in response to the first extraction request, whilst avoiding selection or aggregation errors relating to watermarked properties.

Given that the result R consists of de-watermarked data, an optional watermarking step E13 can be provided before the sending step E15 for security reasons, so as to dissuade the user from distributing extracted data and/or altering the content of this data. For this purpose, the server 2 can use the reversible watermarking mechanism as defined by the watermarking metadata M, or else any other type of watermarking.

In particular, the watermarking step E13 comprises inserting at least one identifier of the user who made the first extraction request R1, making it possible definitively to identify the user who made the first extraction request.

By way of illustrative example, the user's identifier can consist of the identity of the person, coded as a binary sequence, such as the doctor's health professional card number. Anti-collusion codes can also be considered, in other words codes constructed in a particular way in order to identify malicious users who have access to the same database and are collaborating to produce a non-watermarked copy of this database.

The watermarking step E13 can also comprise inserting at least one signature making it possible to verify retrospectively that the extracted data has not been falsified.

By way of illustrative example, it is conceivable to insert a piece of information that makes it possible to check that the use of a dataset does not exceed a particular duration that is set in advance.

The watermarking step E13 can be implemented in particular by a watermarking module 28.7 of the processing module 28 on the server 2.

It is noted, that said at least one identifier and said at least one signature can be inserted jointly during the watermarking step E13.

Thus, the invention will make it possible to identify the culprit behind a cybercrime attack such as theft, leaking or misappropriation of sensitive or confidential information and to protect the integrity of the information extracted from the database, as well as the traceability of this data. In a known manner, the first extraction request R1 can include at least one sub-request SR for selecting a subset of tuples in the table Table, on which the first extraction request R1 performs a selection or filtering with the possible application of one or more aggregation functions. In this case, the first extraction request R1 can generally be described in the following form:

R1: SELECT Properties, Aggregation function(s) FROM SR where SR is: SELECT Properties, Aggregation function FROM Table WHERE Selection conditions, Aggregation function(s).

Naturally, the invention can also be applied to the sub-request SR, as described above.

In a fourth, more complex example, given by way of illustration, the case is discussed where the first extraction request R1 comprises a sub-request SR that aims to select a set of tuples from the relation Table. A relation Table is considered that contains an additional property primary_diagnosis indicating the nature of the primary medical diagnosis made on the patient, this property being watermarked. It is assumed that the user wishes to obtain the maximum value of the average values of the lengths of stay as grouped by diagnosis and the diagnosis for which this maximum value occurs.

In this case, the first extraction request R14 is formulated in SQL language as follows:

R14: SELECT s1.primary_diagnosis, Max(s1.a) FROM (SELECT primary_diagnosis, AVG(Age) AS a FROM Table GROUP BY primary_diagnosis) s1;

This request comprises the sub-request RS: SELECT primary_diagnosis, AVG(Age) AS a FROM Table GROUP BY primary_diagnosis.

Given that the sub-request RS comprises the aggregation function AVG for calculating the average value relating to the watermarked property Age, this function is not included in the second extraction request R24 but rather in the third request R34 according to the invention.

Thus, the second extraction request R24 is formulated as follows:

R24: SELECT stay_id, primary_diagnosis, Age FROM Table

The third request R34 is formulated as follows:

R34: SELECT s1.primary_diagnosis, MAX(s1.a) FROM E' s1

This last request is not executed on the watermarked data in the database, but rather on an intermediate table comprising the de-watermarked extracted data E' and stored in a RAM of the server 2.

Generally, the first extraction request R1 and/or said at least one sub-request SR included in the first extraction request can comprise any type of operations relating to one or more tables, such as joining a plurality of tables.

In a fifth, more complex example, the case is discussed where the first extraction request R1 comprises a plurality of sub-requests and an operation of joining two tables.

For this purpose, a second table Table2 is considered which contains information relating to the doctors such as the service identifier Id and the service name name, service. It is assumed that the previous table Table comprises the doctor's identifier Doctor_id as an additional property.

The user wishes to recover the age of the patients and the service wherein they stayed, solely for patients aged over 18 and for services whose name starts with the letter "N" (for example nephrology, neurology).

For example, the first extraction request R15 is formulated as follows:

R15: SELECT s.Age, m.service FROM (SELECT id, service FROM Table2) m INNER JOIN SELECT Age, doctor_id FROM Table WHERE Age>18) s ON m.id=s, doctor_id WHERE m.service LIKE "N%", where the operator INNER JOIN joins two tables designated as "m" and "s" relating to the doctors and patients respectively.

During the analysis of the first extraction request R15, two sub-requests R150 and R151 are identified:

R150: SELECT id, service FROM Table2
R151: SELECT Age, doctor_id FROM Table WHERE Age>18

These sub-requests act as tables to which the joining operation is applied. The selection of the properties Age and Service from these tables is included in the third request R35 by way of sage and m.service respectively during the obtainment step E9.

Assuming that table Table2 does not contain watermarked properties, the first sub-request R150 can be executed without modification, whilst the second sub-request R151 relating to Table comprising the watermarked property Age has to be altered. The condition Age>18 is transformed into Age>15, given that the watermarking strength of the property Age is equal to ±3. The primary key of the table is used for de-watermarking.

The second extraction requests obtained during E3 are:
R250: SELECT id, service FROM Table2
R251: SELECT stay_id, age, doctor_id FROM Table WHERE Age>15

The second requests R250 and R251 make it possible to recover two tables of results designated as m and s respectively during the extraction step E5.

During the de-watermarking step E7, the watermark is deleted from the table of results s. The de-watermarked results can thus be filtered using the condition Age>18 as present in the first extraction request R1.

The third request R35 to be applied to the results in memory is of the following form:
R35: SELECT sage, m.service FROM m INNER JOIN s ON m.id=s.doctor_id WHERE m.service LIKE "N%";

According to other example implementations, said at least one initial selection condition contained in the first extraction request R1 with respect to said at least one threshold S is transformed as a function of the watermarking strength α according to one of the following cases:
- if said initial condition is of the type A≥S, it is transformed into A≥S−α;
- if said initial condition is of the type A≤S, it is transformed into A≤S+α;
- if said initial condition is of the type "A BETWEEN S1 AND S2", it is transformed into "A≥S1−α OR A≤S+α" or into "A>S1−α OR A<S2+α", where AND is the "and" operator and S1 and S2 are two numerical thresholds;
- if said initial condition is of the type A!=S, it is transformed into A!=S+α OR A!=S−α, where "OR" designates the operator "or".

Naturally, to meet specific needs, a person competent in the field of the invention can make modifications to the above description.

The above examples have been described for numerical properties. However, the present invention also applies to other types of properties, such as categorical. An example of altering a request on a categorical property will now be described. By way of an illustrative example, the property of a patient's eye colour is considered. This categorical property can take the following values: blue ("bleu"), green ("vert"), brown ("marron"), grey ("gris"), black ("noir").

It is assumed that the watermarking operation results in a modification to the values of the categorical property as follows: blue ("bleu")→green ("vert")→brown ("marron")→grey ("gris")→black ("nor") to code a "0" bit and blue ("bleu")←green ("vert")←brown ("marron")←grey ("gris")←black ("noir") to code a "1" bit. This modification rule is recorded in the watermarking metadata.

In this example, it is assumed that the user wishes to obtain the list of all patients having an eye colour starting with the letter m. The first extraction request R16 is formulated in SQL, according to the following example:
R16: SELECT * FROM Table WHERE eye_colour LIKE 'm%'

According to the principle of the invention, the value m% of the categorical property in the condition LIKE 'm%' has to be altered, since the value of the property eye_colour has been altered during watermarking.

According to the watermarking rule, the value "marron" (brown), which is the only one to start with the letter m, has been replaced with either gris (grey) or vert (green). As a result, the initial selection condition is transformed into the union of two selection conditions such that the second extraction request R26 is expressed as follows:

R26: SELECT * FROM Table WHERE eye_colour LIKE 'g%' OR eye_colour LIKE 'v%'

Thus, the initial selection condition has been transformed into at least two sub-conditions performing the selection of tuples with respect to two determined categorical values g% and v% as a function of the watermarking rule predefined in the watermarking metadata.

As described in the previous examples, once the results are extracted from the database in response to this second extraction request R26, the results are de-watermarked and filtered according to the first extraction request R16 in order to obtain the desired final result.

Although the present invention has been described above with reference to a specific embodiment, the present invention is not limited to this single specific embodiment, and the modifications found in the field of application of the present invention will be obvious to a person skilled in the art.

The examples described above are non-limiting, it will be understood that any other type of requests can be considered, whilst taking into account the applications and language under consideration. For example, it is not necessary for the requests to contain one or more aggregation functions. Other types of extraction request can contain one or more selection properties from among the watermarked or non-watermarked properties, with one or more selection conditions and/or one or more aggregation functions relating to one or more watermarked or non-watermarked properties. As a result, the server will be able to be adapted to implement the method according to the invention as a function of the content of the request, whilst taking into account the specifics of the language used.

The invention claimed is:

1. A method for extraction of data by a server in a database of data that is watermarked according to a reversible watermarking mechanism defined by watermarking metadata, said database comprising tuples comprising at least one watermarked property, said method comprising:
  receiving a first extraction request from a client terminal to select a first set of tuples from said database, according to at least one initial selection condition relating to the value of said at least one watermarked property with respect to at least one threshold;
  obtaining, from said first extraction request, a second extraction request to select a second set of tuples comprising the properties of the first set of tuples including said at least one watermarked property to which said at least one selection condition relates, said second extraction request comprising at least one selection condition obtained by transforming said at least one initial selection condition relating to at least one watermarked property;
  extracting the tuples of said second set, during which extraction the tuples of said second set are extracted from said database according to the second extraction request;
  de-watermarking said second set of extracted tuples, during which de-watermarking the tuples of said second set of extracted tuples are de-watermarked according to the watermarking metadata;
  obtaining, from the first extraction request, a third request to select a third set of tuples from said second set of de-watermarked tuples, said third request comprising said at least one initial selection condition;
  the second set of de-watermarked tuples, during which filtering the third request is applied to the second set of de-watermarked tuples; and
  sending results from the filtering to the client.

2. The method according to claim 1, wherein said at least one watermarked property is numerical, and said at least one initial selection condition with respect to said at least one threshold is transformed in a function of a watermarking strength stipulated in the watermarking metadata according to any one of the following cases:
  if said initial condition is of the type A>S or A≥S, it is transformed into A>S−α or A≥S−α respectively;
  if said initial condition is of the type A<S or A≤S, it is transformed into A<S+α or A≤S+α respectively;
  if said initial condition is of the type S1≤A≤S2, it is transformed into A≥S1−α and A≤S2+α;
  if said initial condition is of the type S1<A<S2, it is transformed into A>S1−α and A<S2+α;
  if said initial condition is of the type A=S, it is transformed into A=S+α or A=S−α;
  if said initial condition is of the type A≠S, it is transformed into A≠S+α or A≠S−α,
  wherein A is said value of said at least one watermarked property, A1 is a first watermarked property, S is said at least one threshold and S1 and S2 are two different thresholds, and α is said watermarking strength.

3. The method according to claim 1, wherein said at least one watermarked property is of categorical type and in that said at least one initial selection condition is transformed into at least two sub-conditions that bring about the selection of tuples with respect to categorical values determined as a function of a watermarking rule predefined in the watermarking metadata.

4. The method according to claim 1, wherein the second extraction request comprises at least one selection condition, relating to a non-watermarked property, that is present in the first extraction request.

5. The method according to claim 1, wherein the second extraction request comprises at least one aggregation function, relating to a non-watermarked property, that is present in the first extraction request.

6. The method according to claim 1, wherein in the presence, in said first extraction request, of at least one aggregation function relating to a watermarked property, said at least one aggregation function is excluded from said second extraction request but included in the third request, and the watermarked property to which said at least one watermarked aggregation function relates is inserted into the second extraction request as a selection property.

7. The method according to claim 1, wherein the method further comprises a watermarking step, during which the extracted de-watermarked data from the filtering or transformation step are watermarked before the sending step.

8. The method according to claim 7, wherein watermarking the data comprises inserting into the extracted de-watermarked data at least one identifier of a user who made the first extraction request and/or at least one signature and/or traceability information.

9. A product non-transitory computer readable medium comprising computer usable instructions executable by a computer processor in memory of a computer, and when executed, perform:
  receiving a first extraction request from a client terminal to select a first set of tuples from a database, according to at least one initial selection condition relating to a value of at least one watermarked property with respect to at least one threshold;
  obtaining, from said first extraction request, a second extraction request to select a second set of tuples comprising the properties of the first set of tuples including said at least one watermarked property to which said at least one selection condition relates, said second extraction request comprising at least one selection condition obtained by transforming said at least one initial selection condition relating to at least one watermarked property;
  extracting the tuples of said second set, during which extraction the tuples of said second set are extracted from said database according to the second extraction request;
  de-watermarking said second set of extracted tuples, during which de-watermarking the tuples of said second set of extracted tuples are de-watermarked according to the watermarking metadata;
  obtaining, from the first extraction request, a third request to select a third set of tuples from said second set of de-watermarked tuples, said third request comprising said at least one initial selection condition;
  filtering the second set of de-watermarked tuples, during which filtering the third request is applied to the second set of de-watermarked tuples; and
  sending results from the filtering to the client.

10. A server computer comprising memory and a processor, the computer executing computer program instructions suitable for performing:
  receiving a first extraction request from a client terminal to select a first set of tuples from a database, according to at least one initial selection condition relating to a value of at least one watermarked property with respect to at least one threshold;
  obtaining, from said first extraction request, a second extraction request to select a second set of tuples comprising the properties of the first set of tuples including said at least one watermarked property to which said at least one selection condition relates, said second extraction request comprising at least one selection condition obtained by transforming said at least one initial selection condition relating to at least one watermarked property;
  extracting the tuples of said second set, during which extraction the tuples of said second set are extracted from said database according to the second extraction request;
  de-watermarking said second set of extracted tuples, during which de-watermarking the tuples of said second set of extracted tuples are de-watermarked according to the watermarking metadata;
  obtaining, from the first extraction request, a third request to select a third set of tuples from said second set of de-watermarked tuples, said third request comprising said at least one initial selection condition;
  filtering the second set of de-watermarked tuples, during which filtering the third request is applied to the second set of de-watermarked tuples; and
  sending results from the filtering to the client.

* * * * *